(No Model.)
W. H. HOBSON.
HARROW TOOTH AND HARROW ATTACHMENT.
No. 376,801. Patented Jan. 24, 1888.
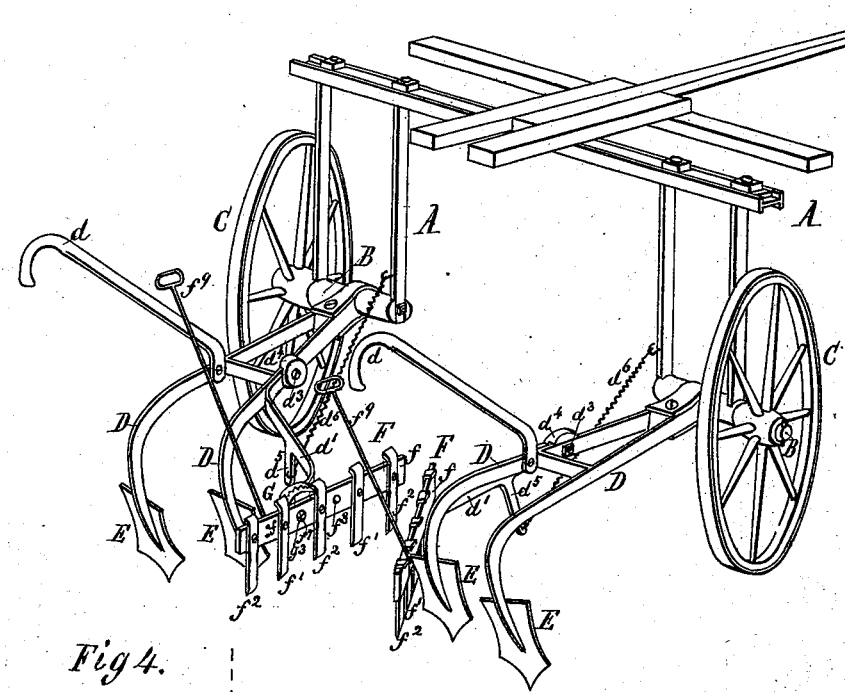
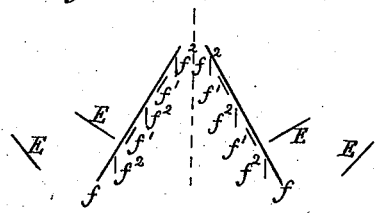
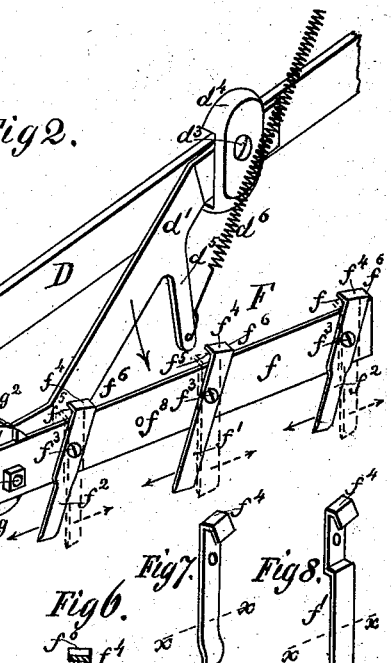
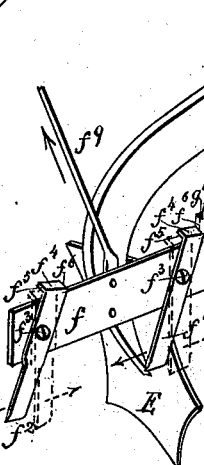
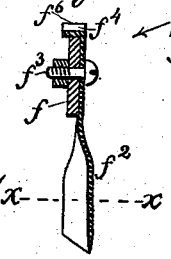
Witnesses:
Robt. S. Fenwick.
M. Redman
Inventor:
William H. Hobson
by his attys
Mason, Fenwick

UNITED STATES PATENT OFFICE.

WILLIAM HENRY HOBSON, OF LA MONTE, MISSOURI.

HARROW-TOOTH AND HARROW ATTACHMENT.

SPECIFICATION forming part of Letters Patent No. 376,801, dated January 24, 1888.

Application filed December 10, 1886. Serial No. 221,204. (No model.)

*To all whom it may concern:*

Be it known that I, WILLIAM HENRY HOBSON, a citizen of the United States, residing at La Monte, in the county of Pettis and State of Missouri, have invented certain new and useful Improvements in Harrow-Teeth and Harrow Attachments; and I do hereby declare the following to be a full, clear, and exact description of the invention, such as will enable others skilled in the art to which it appertains to make and use the same.

My invention consists in certain novel constructions, combinations, and arrangements of parts, as will be hereinafter described, whereby the harrow-teeth are improved, the harrow attachment can be adjusted at different inclinations to suit ridges and valleys of the land and made to answer both as a harrow and fender, and other advantages are secured, as will more fully appear in the following specification.

In the accompanying drawings, Figure 1 is a perspective view of a cultivator provided with my improved harrow attachment. Fig. 2 is an enlarged perspective view of one of the inner cultivator-shovels, a portion of the shovel-bar, and my harrow attachment. Fig. 3 is a perspective view of one of a pair of coupling-plates forming part of my invention. Fig. 4 is a diagram illustrating the relative positions of the cultivator-shovels and my harrow attachment and harrow-teeth to one another and to the line of draft. Figs. 5 and 6 are longitudinal sections, respectively, of a twisted and of a plain harrow-tooth and their fastenings. Figs. 7 and 8 are perspective views of modified constructions of said harrow-teeth, and Fig. 9 is a horizontal section in the line $x\,x$ of the harrow-teeth.

A in the drawings represents a cultivator-frame; B, axles; C, wheels; D, cultivator-beams; E, shovels, and F harrow.

The above-named parts, excepting the harrow, may be of ordinary construction, as found in machines for cultivating corn.

The cultivator-beams D, being hinged to the axles B, can be elevated and depressed by handles $d$. The two inner cultivator-beams are provided with arms $d'$, which are attached to said beams by means of pivots $d^3$ and housings $d^4$, of well-known construction, which permit limited oscillations of the arms $d'$. To the arm $d'$ the harrow F is attached by means of a coupling, G, which consists of two disks, $g$, having each a straight or plain surface, with lugs $g'$ and spaces between them, and so arranged that the arm $d'$ and the harrow-bar $f$ can be placed in said spaces between them in two positions, one at a right angle to the other. The other surfaces of the disks $g$ are beveled and provided with radial serrations $g^2$, by means of which the two disks $g$ can be firmly held at different angles when united by a central screw-bolt, $g^3$, and the arm $d'$ and bar $f$, being united by the same bolt, $g^3$, may be thus held at any desired vertical angle. The disks $g$, respectively, being of beveled or wedge shape, the horizontal angle of the arm $d'$ and bar $f$ may be so adjusted that the harrow stands more or less oblique to the line of draft, according to the distance between rows of corn being cultivated.

The harrow-bar $f$ is provided with flat sharpened harrow-teeth $f'\,f^2$, sharp at the lower end and at both edges, as shown in Figs. 1, 2, 5, 6, 7, 8, and 9, and the said harrow-teeth may be straight, as seen at $f'$, and twisted, as seen at $f^2$. Harrow-teeth of both kinds attached in alternate order to the harrow-bar, as shown, will cut weeds and pulverize the earth very effectively along the slope of a corn-row, and will not throw up large clods and stones, as is done by the cultivator-shovels.

The harrow-teeth $f'\,f^2$ are fastened to the harrow-bar $f$ by means of bolts $f^3$, and they are held in vertical or in an inclined position by aid of angular offsets $f^4$, formed on the top portion of the harrow-teeth. The said angular offsets $f^4$ form a right angle with the broad side of the tooth, and stand inclined toward its narrow sides, and through the latter formation the tooth obtains a small allowance of motion around the bolt $f^3$, inasmuch as the one corner, $f^5$, of the offset $f^4$, when caused to bear upon the top surface of the harrow-bar $f$, will keep the harrow-tooth in a perpendicular position, and the other corner, $f^6$, under similar circumstances, will keep it in an inclined position.

In order to have the teeth stand properly, either in a vertical or inclined position, I make the harrow reversible by providing it with a hole, $f^8$, symmetric with the hole $f^7$, into which latter the bolt $g^3$ is inserted, as represented in the drawings. The harrow is reversed by disconnecting it from the arm $d'$, then turning its rear end to the front, and reattaching to the arm $d'$ by inserting the bolt $g^3$ into either the hole $f^7$ or $f^8$, as the case may be.

The arm $d'$ is provided with an angular projection, $d^5$, which is connected with the frame A by means of a spring, $d^6$, the tension of which holds the harrow-teeth down into the ground sufficiently deep for ordinary harrowing. When the tension of said spring is not sufficient to keep the harrow-teeth in the earth, the harrow can be pressed down to the required depth by hand with the aid of a handle, $f^9$, suitably attached to the harrow-bar. By means of said handle $f^9$ the harrow can also be lifted out of the ground whenever the safety of the harrow-teeth requires. The harrow-teeth $f' f^2$ are held down in the ground to their proper working depth, and while this is so they and their bars serve as fenders for pushing lumps and stones along and toward the valley between the corn-row ridges being harrowed. The bar $f$ also extends sufficiently beyond the inner cultivator-blade to serve as a fender for it, and it thus prevents the rolling of heavy lumps and stones upon the plants at the ridge.

By attaching the harrow in the manner described it operates without lateral motion from or toward the cultivator-bar, but may be moved vertically independent of the cultivator-bar. It may also be laterally adjusted to form a more or less acute angle with the line of draft, and to stand at various inclinations toward a horizontal plane. Thus it will be seen that my harrow attachment is suitable for all requirements in cultivating.

It will not in all cases be found necessary to employ adjustable harrow-teeth $f' f^2$, as the condition of the land may be suitable for the use of vertical teeth altogether, in which case I will attach said harrow-teeth rigidly to the harrow-bar. My harrow-bar $f$, with the teeth $f' f^2$, may also be employed in the construction of a triangular or rectangular harrow, and when thus employed the operation of the straight and twisted teeth $f' f^2$ will be exactly the same as when attached to the cultivator.

It will be seen that the disks $g$, by means of their serrated surfaces, can be united at several different positions without danger of displacement, such variety of positions being desirable in order to obtain the most advantageous position for the harrow-bar necessary for its successful operation, and as these disks are perfectly similar in construction and the lugs $g'$ thereon stand equidistant, they can be placed in four different positions on either the arm $d'$ or bar $f$, and thus I am enabled to unite the arm $d'$ and bar $f$ at suitable positions to each other with a variety of inclinations of the harrow-bar toward the line of draft.

The disks $g$ of the coupling G being provided with spaces between the lugs $g'$, which spaces run at right angles to one another, the one or the other of said disks can be turned a quarter around, or upside down, in order to suit any inclination of the harrow required for its adjustment upon the ridges to be cultivated.

Whenever the changes effected by the different relative positions of the disks $g$ do not sufficiently contract or expand the pair of harrows, the harrow-bars $f$ may be shifted longitudinally without reversal by being fastened at the hole $f^7$ or $f^8$, as circumstances may require.

It will be seen from the drawings that my harrow attachment, with its improved teeth, or, if desired, with ordinary harrow-teeth, is adapted for application on each side of the row of plants, so as to come between the plants and a right-hand shovel on one side of the ridge and the plants and a left-hand shovel on the other side of the ridge, and thus answer the ordinary purposes of fenders while performing the office of harrowing the soil.

It will also be seen that the two harrow attachments can be set farther apart or nearer together while standing divergent from one another, accordingly as the distance between the rows requires; also can be inclined more or less to suit the incline of the ridges and depth of the valleys.

What I claim is—

1. The combination, with a straddle-row cultivator having cultivator-shovels on each side of the row of plants being cultivated, of two symmetrical oblique harrows, F F, having arms $d'$, pivoted, respectively, to the cultivator-bars and located between the respective inner cultivator-bars and the row of plants, and each adapted for harrowing a sloped surface of the ridge of earth about the row of plants, substantially as and for the purpose described.

2. The oblique harrow-bar $f$, having its straight and twisted sharpened teeth all on a line, each alternate tooth twisted or each alternate tooth straight, and each tooth formed with an integral offset, $f^4$, which is oblique with respect to the upper edge of said bar $f$, and confined by a bolt, $f^3$, in combination with the pivoted arm $d'$ and cultivator-bar D, the arm $d'$ being pivoted to the bar D, substantially as and for the purpose described.

3. The oblique harrow-bar $f$, having its straight and twisted teeth $f' f^2$ arranged on a line, and a straight tooth succeeded by a twisted tooth, or a twisted tooth succeeded by a straight tooth, whereby both the straight and twisted teeth have their cutting-edges set diagonally to the line of draft, one set in the direction of the line of the harrow-bar and the other set across said line of the bar, substantially as and for the purpose described.

4. The combination of a cultivator-bar, arm $d'$, harrow F, and an adjusting disk-coupling, G, having beveled serrated surfaces, substantially as and for the purpose described.

5. The combination of the oscillating arm $d'$ of harrow F, the cultivator-frame A, and the spring $d^6$, substantially as and for the purpose described.

6. The combination, with a cultivator-bar, D, of a harrow, F, on an oscillating arm, $d'$, said harrow being arranged between the bar D and row of plants, and serving the twofold purpose of harrowing the same and fending the plants, substantially as described.

7. The combination, with the harrow-bar $f$ and its pivoted arm $d'$, and with the cultivator-bar D and fastening-bolt, of the coupling G, consisting of the bevel-faced disks $g$, having serrated surfaces, as $g^2$, and equidistant lugs $g'$, with intersecting spaces between them, whereby the harrow-bar, with its teeth, can be set more or less inclined to the horizon, and also more or less oblique to the row of plants and the line of draft, substantially as and for the purpose described.

8. The combination of the coupling G, having bevel-faced disks which are provided with suitable means by which they are adjusted relatively to each other, as described, with the harrow-tooth bar $f$, whereby the harrow-bar, with its teeth, can be set more or less oblique to the line of draft or row of plants, substantially as and for the purpose described.

9. In combination with a harrow-bar, the harrow-tooth formed above its pivot-connection with an offset, $f^4$, integral with the body of the tooth and set at an angle oblique to the edge of the harrow-bar to which it is attached, and to the length of said bar, so that when the tooth stands inclined it is sustained by one side of said offset bearing against the bar, and when it is set vertical it is also sustained by the opposite side of said offset bearing against said bar, substantially as described.

In testimony whereof I affix my signature in presence of two witnesses.

WILLIAM HENRY HOBSON.

Witnesses:
J. N. MILLER,
J. W. McARTOR.